United States Patent Office.

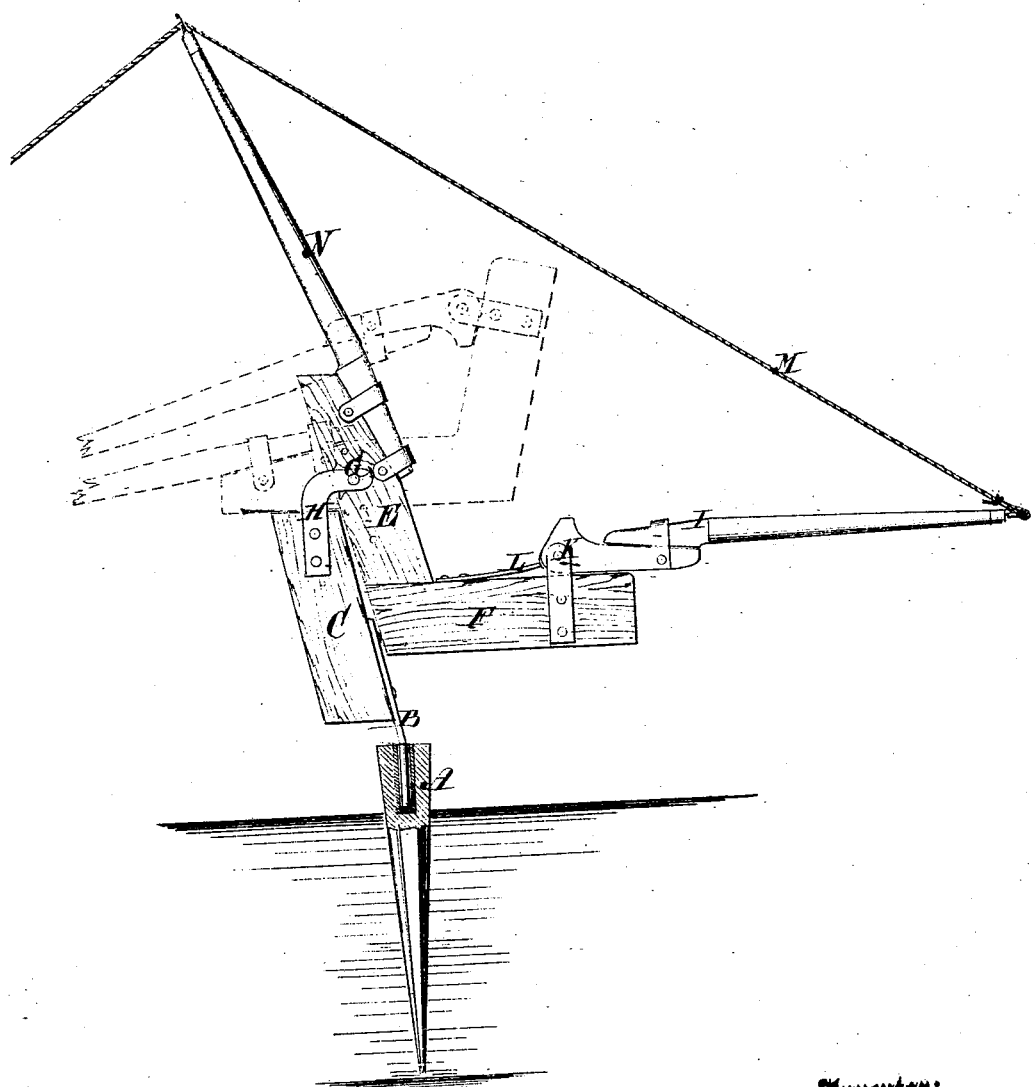

THOMAS NORTHRUP WHEELER, OF BLUE EARTH CITY, MINNESOTA.

Letters Patent No. 105,018, dated July 5, 1870.

IMPROVED ANIMAL TETHER.

The Schedule referred to in these Letters Patent and making part of the same.

*To all whom it may concern:*

Be it known that I, THOMAS NORTHRUP WHEELER, of Blue Earth City, in the county of Fairbault and State of Minnesota, have invented a new and Improved Animal Picket; and I do hereby declare that the following is a full, clear, and exact description thereof, which will enable others skilled in the art to make and use the same, reference being had to the accompanying drawing forming part of this specification.

This invention relates to improvements in apparatus for picketing animals, and consists in an improved arrangement of means for maintaining a sufficient tension on the cord to prevent it from getting around the legs or necks of the animals, and yet permit them the full range of it.

The drawing represents a side elevation of my improved apparatus, one part being sectioned.

A represents a stake, to be driven into the ground for supporting the apparatus, which is attached to a bar, B, mounted in a socket in the stake, so as to turn horizontally.

C is a block of wood, supported on the bar B, either vertically or nearly so.

E F represent a pair of blocks, connected together so as to form two sides of an obtuse triangle, and suspended on a pivot, G, supported in arms H, projecting from the top of the block C, so that the block E will hang by the side of C.

The block F, which projects horizontally, supports a leader-pole, I, pivoted to it at K, and having a spring, L, arranged with it, so as to have a tendency to throw the pole back after being drawn up to the vertical position.

The cord M is attached to the end of this leader-pole, and passes through an eye in the top of another pole, N, rising up from the block E, thence the cord hangs down for attachment to the animal.

When the animal is tied to the cord, and draws it through the eye on the top of the pole N, the weight of the pole I and the spring will take up the slack of the rope and keep it from under his feet.

When the pole I is drawn up against the pole N, the continued strain on the cord will swing the blocks E F up on the pivot G until they arrive at the position represented in dotted lines, when the paying out of the cord will cease; and, when the animal returns toward the stake, the weighted blocks will first take up the slack by swinging back to the position shown in the drawing, then the leading-pole, being first thrown back by the spring and afterwards falling by gravity, will continue to keep the cord taut.

The block E is provided with a number of poles for the pivot-bolt G, for shifting it to vary the center of motion, so that the weight on the cord may be varied for different animals.

For convenience of storage and transportation, the bars I N are detachably connected to the blocks.

Having thus described my invention,

I claim as new and desire to secure by Letters Patent—

The combination with the stake A, of the horizontally-revolving block C, blocks E F, poles I N, cord M, and spring L, arranged and operating substantially as specified.

THOMAS N. WHEELER.

Witnesses:
J. BOUGHLEN,
J. F. STAKNELL.